G. H. CATER.
MECHANICAL MOVEMENT.
APPLICATION FILED JUNE 15, 1917.
1,254,981.
Patented Jan. 29, 1918.
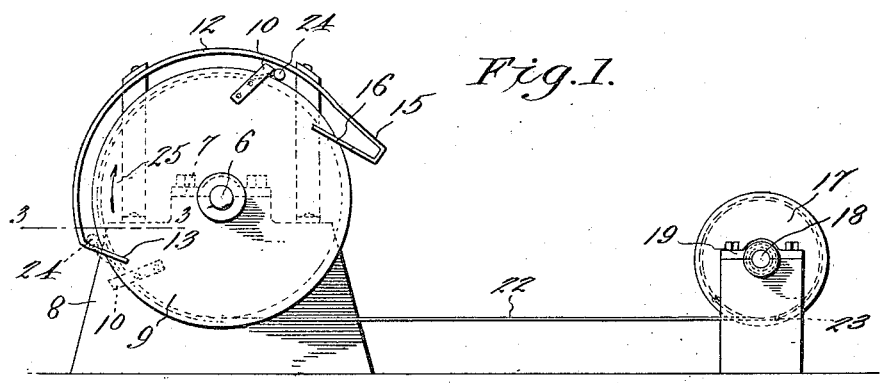
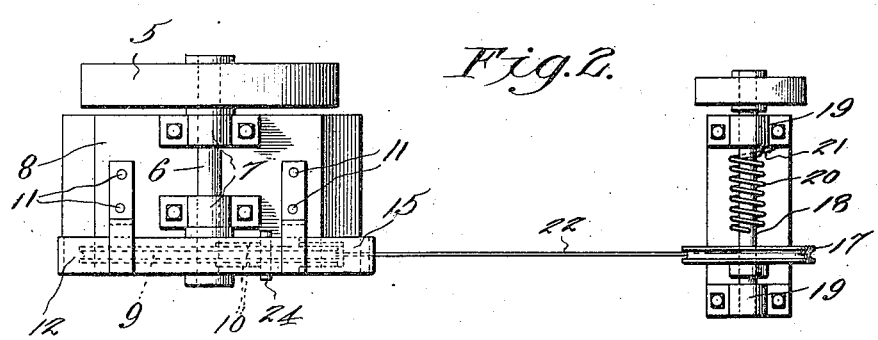
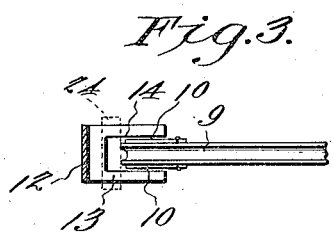
WITNESSES
INVENTOR
G. H. Cater,
BY Victor J. Evans
ATTORNEY

UNITED STATES PATENT OFFICE.

GEORGE H. CATER, OF ANTIOCH, CALIFORNIA.

MECHANICAL MOVEMENT.

1,254,981.   Specification of Letters Patent.   Patented Jan. 29, 1918.

Application filed June 15, 1917.   Serial No. 175,011.

*To all whom it may concern:*

Be it known that I, GEORGE H. CATER, a citizen of the United States, residing at Antioch, in the county of Contra Costa and State of California, have invented new and useful Improvements in Mechanical Movements, of which the following is a specification.

This invention has reference to a means for imparting an alternating rotary movement in a reverse direction to a shaft, and the primary object of the invention is to produce a device for this purpose which shall be of a simple, cheap and thoroughly efficient nature.

Other objects and advantages will appear as the nature of the invention is more fully understood, reference being had to the accompanying drawings, in which, Figure 1 is a side elevation of the device constructed in accordance with the present invention, the dotted lines indicating the arrangement of parts when the driven wheel is permitted a reverse rotary movement from that imparted by the driving wheel.

Fig. 2 is a top plan view of the same.

Fig. 3 is a detail sectional view approximately on the line 3—3 of Fig. 1.

Referring now to the drawings in detail, the numeral 5 designates a drive wheel which derives its power from any suitable source, as for instance, the same may be provided with an endless belt connected with a pulley wheel of a suitable motor, (not shown). The shaft for the drive wheel is indicated by the numeral 6, the same being journaled in a suitable bearing 7 secured to a suitable support 8, and upon the drive shaft 6 is keyed or otherwise secured a grooved pulley wheel 9. Upon the wheel 9 is arranged a finger 10 projecting beyond the periphery of the said wheel, and having one of its ends secured as at 11, to the support 8 is an arched guide 12 arranged concentrically with and disposed above the pulley 9. One end of the guide or guard 12, (the end thereof disposed nearest the support 8), is provided with an offset portion 13 projecting in the direction of the support and in the direction of the pulley wheel 9, and this member 13 is slotted as at 14. The opposite end of the guide 12 is provided with a substantially rectangular extension 15 disposed at an outward angle with respect to the pulley 9 and to the support 8, the inner arm 16 of the said extension 15 being slotted whereby to receive the periphery of the pulley 9.

The driven wheel is in the nature of a pulley and is indicated by the character 17, the same being provided with a suitable shaft 18 journaled in suitable bearings 19 and surrounding the said shaft and having one of its ends secured thereto is a coil spring 20, the opposite end of the said spring being secured to a suitable support 21. Carried by the grooved or pulley wheel 17 is a flexible element, in the nature of a cord or cable 22 having one of its ends secured to the said wheel as at 23, the said flexible element 22 being trained under the pulley wheel 9 and having its extremity connected with a laterally extending element 24 that is arranged between the pulley and the guard or guide 12. The operation is described as follows: The driven wheel 5 and the pulley 9 connected therewith at all times turn in one direction as indicated by the arrow 25 in Fig. 1 of the drawings. The member 24, in the position illustrated by the full lines in the said Fig. 1 of the drawings, is received upon the element 13, and in this condition it is to be stated that the member 24 is preferably round in cross section. The member 24 is in the path of contact with the finger 10, and in this connection, it will be stated that preferably two of said fingers are employed, one on each side of the pulley 9, and disposed one directly opposite the other. The members 10 will, in the revolution of the pulley 9 contact with the member 24, causing the same to ride between the guard 12 over the periphery of the pulley 9, until the same is received within the pocket provided by the extension 15 of the guard. This, it will be noted, draws the flexible element or cable 22 partly off of the grooved wheel or pulley 17, revolving the shaft 18, to wind the spring 20. When the member 10 forces the element 24 to within the pocket 15, the said member 10 will be relieved of contact with the said element 24, thus relieving the tension of the spring 20, which, unwinding, will turn the shaft 18 in a reverse direction. This turning of the shaft also winds the flexible element 22 upon the wheel 17, forcing the element 24 around the periphery of the pulley 9 until the same is again received upon the portion 13 of the guard or guide 12, and this movement is repeated as long as the shaft 6 is in motion.

From the foregoing description, when taken in connection with the drawings, it will be noted that I have produced a mechanical movement whereby an alternating rotary movement, in a reverse direction, is imparted to a driven shaft, and while my improvement is primarily devised for operating the moving member of a washing machine, it is to be understood that I am not to be thus limited to this useful operation, as it will be readily apparent that the device is operable in other uses with equal efficiency.

While I have illustrated and described the driven wheel adapted to turn in one direction by the spring 20, it is to be understood, that if desired, the reverse motion for the said driven wheel may be obtained by mechanism similar to that disclosed in connection with the drive wheel or pulley wheel any suitable power being utilized for turning the driven wheel in a reverse direction to that of the drive wheel.

Having thus described the invention, what I claim is:

1. In a mechanical movement, a drive shaft and means for imparting motion thereto, a wheel connected with the drive shaft, a spring influenced driven shaft, a flexible element associated therewith, and means upon the wheel of the drive shaft designed to intermittently engage with the said flexible element whereby to turn the driven shaft against the influence of its spring, to wind said spring and to permit of the same imparting a reverse rotary movement to the driven shaft when the flexible element has been released by the means upon the wheel.

2. In a mechanical movement, a drive shaft and means for imparting motion thereto, a wheel secured to said shaft, a guard member having offset ends partially surrounding the wheel, a spring influenced driven shaft and a flexible element associated therewith and having one of its ends arranged in the guard, and means upon the referred to wheel for engaging with the said end of the flexible element to bring the same from one of the offset ends of the guard to within the second offset end of the guard and there release the said flexible element to permit of the spring influencing the driven shaft to turn the same in a reverse direction.

3. In a mechanical movement, a driven shaft and means for imparting motion thereto, a wheel upon the driven shaft, an arched guard partially surrounding the wheel and having offset ends, one directed toward the wheel, the other being in the nature of a substantially rectangular member and directed away from the wheel but having one of the longitudinal elements thereof overlying the wheel, a contact element upon the wheel projecting beyond the periphery thereof, a spring influenced driven shaft, a grooved wheel thereon, a flexible element wound around the grooved wheel secured thereto, and extended toward the first mentioned wheel and having an element connected with the said end and arranged in the guard designed to be influenced by the contact member upon the wheel whereby to move the same over the periphery of the wheel and deliver the same to within the rectangular end of the guard and there release the same, whereby to wind the spring and to permit of the latter, when the flexible element is released, imparting a reverse rotary movement to the driven shaft.

4. In a mechanical movement, two shafts, one designed to be continuously rotated in one direction, a flexible element wound around and secured to the second shaft and having a loose connection with the first mentioned shaft, means, upon the first mentioned shaft co-engaging with the flexible element for positively locking the said element thereto to cause the second mentioned shaft to be rotated by the first mentioned shaft for a predetermined distance and said means also designed to release said flexible element, and means, upon the second mentioned shaft for imparting a rotary movement thereto in a reverse direction from that imparted by the connection with the flexible element with the first mentioned shaft for a length of time corresponding to the release of the flexible element by the said first mentioned shaft.

In testimony whereof I affix my signature.

GEORGE H. CATER.